US012570873B2

(12) United States Patent
Latz et al.

(10) Patent No.: US 12,570,873 B2
(45) Date of Patent: Mar. 10, 2026

(54) GLASSINE PAPER MATERIAL FOR WRAPPING SELF-ADHESIVE NOTE PADS

(71) Applicant: UPM RAFLATAC OY, Tampere (FI)

(72) Inventors: Henning Latz, Kaltenkirchen (DE); Wolfgang Leichner, Kaltenkirchen (DE); Olaf Friederichs, Kaltenkirchen (DE)

(73) Assignee: UPM RAFLATAC OY, Tampere (FI)

( * ) Notice: Subject to any disclaimer, the term of this patent is extended or adjusted under 35 U.S.C. 154(b) by 0 days.

(21) Appl. No.: 18/567,849

(22) PCT Filed: Jun. 9, 2022

(86) PCT No.: PCT/EP2022/065737
§ 371 (c)(1),
(2) Date: Dec. 7, 2023

(87) PCT Pub. No.: WO2022/258772
PCT Pub. Date: Dec. 15, 2022

(65) Prior Publication Data
US 2024/0271009 A1 Aug. 15, 2024

(30) Foreign Application Priority Data
Jun. 9, 2021 (EP) ..................................... 21178650

(51) Int. Cl.
B65D 65/14 (2006.01)
B65D 65/42 (2006.01)
(Continued)

(52) U.S. Cl.
CPC ................ C09J 7/21 (2018.01); B65D 65/14 (2013.01); B65D 65/42 (2013.01); C09J 5/06 (2013.01);
(Continued)

(58) Field of Classification Search
CPC ......... C09J 7/21; C09J 7/35; C09J 5/06; C09J 2301/414; C09J 2301/304; C09J 2301/204;
(Continued)

(56) References Cited

U.S. PATENT DOCUMENTS

| | | |
|---|---|---|
| 1,986,954 A | 1/1935 | Abrams et al. |
| 2,575,727 A | 11/1951 | Garrett |

(Continued)

FOREIGN PATENT DOCUMENTS

| | | |
|---|---|---|
| JP | H08332707 A | 12/1996 |
| JP | H10168800 A | 6/1998 |

(Continued)

OTHER PUBLICATIONS

International Search Report and Written Opinion for the corresponding International Application No. PCT/EP2022/065737, Date of Mailing: Sep. 30, 2022; 14 pages with English translation of ISR.
(Continued)

*Primary Examiner* — Jacob K Ackun
(74) *Attorney, Agent, or Firm* — Nixon Peabody LLP

(57) ABSTRACT

The invention relates to a wrapping material (1) for wrapping an article (10), which is based on glassine paper with a grammage in the range of 25 to 50 g/m², wherein the wrapping material (1) is present in the form of a web. The web has i. a first side face (S1), ii. a second side face (S2) situated opposite the first side face (S1), iii. at least one web portion (B) having a first and a second outer region portion (2, 3) and inner region portions (4, 5, 6, 7, 8), wherein the inner region portions are arranged between the outer region portions (2, 3). A heat-sealable coating is applied to the glassine paper on at least one of the two side faces (S1, S2) in at least one first outer coating region (2a-2g) in the first outer region portion (2) of the web portion (B). A heat-
(Continued)

sealable coating is applied to the glassine paper on at least one of the two side faces (S1, S2) in at least one second outer coating region (3a-3g) in the second outer region portion (3) of the web portion (B).

20 Claims, 11 Drawing Sheets

(51) Int. Cl.
| | |
|---|---|
| *C09J 5/06* | (2006.01) |
| *C09J 7/21* | (2018.01) |
| *C09J 7/35* | (2018.01) |
| *D21H 19/12* | (2006.01) |
| *D21H 19/68* | (2006.01) |
| *D21H 27/06* | (2006.01) |
| *D21H 27/10* | (2006.01) |

(52) U.S. Cl.
CPC ................ *C09J 7/35* (2018.01); *D21H 19/12* (2013.01); *D21H 19/68* (2013.01); *D21H 27/06* (2013.01); *D21H 27/10* (2013.01); *C09J 2301/204* (2020.08); *C09J 2301/304* (2020.08); *C09J 2301/414* (2020.08); *C09J 2400/283* (2013.01); *C09J 2400/286* (2013.01)

(58) Field of Classification Search
CPC ........ B65D 65/14; B65D 65/42; D21H 19/12; D21H 19/68; D21H 27/06; D21H 27/10

USPC ................. 206/215, 524.1, 524.6; 229/87.01
See application file for complete search history.

(56) References Cited

U.S. PATENT DOCUMENTS

| | | | |
|---|---|---|---|
| 3,223,662 A | 12/1965 | Dreger | |
| 3,904,806 A * | 9/1975 | Waggoner .............. | D21H 19/22 |
| | | | 428/511 |
| 2009/0047525 A1* | 2/2009 | Tilton ..................... | B32B 27/10 |
| | | | 428/441 |
| 2013/0052687 A1* | 2/2013 | Medoff ................... | C12P 19/02 |
| | | | 536/124 |
| 2020/0385929 A1 | 12/2020 | Baumlin et al. | |

FOREIGN PATENT DOCUMENTS

| | | | |
|---|---|---|---|
| JP | H11216811 A | 8/1999 | |
| JP | 2019172277 A | 10/2019 | |
| JP | 3232146 U | 5/2021 | |
| WO | 2019238498 A1 | 12/2019 | |

OTHER PUBLICATIONS

Office Action for the Chinese Application No. 202280041640.X, Date of Dispatch: Aug. 20, 2025; 9 pages, English translation.

* cited by examiner

1000

2000

2000

GLASSINE PAPER MATERIAL FOR WRAPPING SELF-ADHESIVE NOTE PADS

CROSS-REFERENCE TO RELATED APPLICATIONS

This application is a National Stage application of PCT/EP2022/065737, filed Jun. 9, 2022, which claims benefit of European Application No. 21178650.4 filed on Jun. 9, 2021, both of which are incorporated by reference herein in their entirety.

The invention relates to a wrapping material based on glassine paper for wrapping an article, specifically in particular an article made of a coated and paper-based material. The invention also relates to the use of the wrapping material for wrapping an article made of a coated and paper-based material. In addition, the invention relates to a method for producing the wrapping material and to a method for wrapping an article. Moreover, the invention relates to a wrapped article.

Self-adhesive notes (including adhesive strips) are well-known products and for more than three decades have simplified the marking of objects or documents and facilitated the handling of notes in office environments. Such adhesive notes are typically produced in the form of small pads (of for example 50 or 100 sheets) and are usually packaged (wrapped) individually in film, wherein the pads wrapped in this way are often additionally supplied wrapped in film in the form of a multipack (of for example 2 to 20 pads). Furthermore, self-adhesive note pads with up to approximately 500 sheets are commercially available. The wrapping of the individual pads and the multipacks of pads serves firstly for protection during transport (against dust, impurities and moisture). Secondly, the film wrap in printed form serves as a communication means for trade marks and for certain product properties of the self-adhesive notes.

U.S. Pat. No. 2,575,727 A1 (1951) teaches the pretreatment of glassine with an alkaline earth metal or ammonium phosphate, silicate or carbonate solution. The pretreatment makes it possible to coat the glassine at least on one side and preferably on both sides over the entire surface area with thermoplastic resin. The coating increases the transparency of the glassine.

It is commercially routine for self-adhesive note pads and multipacks to be largely wrapped in thin and biaxially oriented polypropylene (BoPP) films with a grammage of approximately 25 g/m², wherein the films are securely closed by means of hot sealing on the end or rear face. Fine tear-open threads or punched-out easy-open tabs (or fine tear-open threads and punched-out easy-open tabs), which are intended to make it easier to remove the film wrap, are frequently integrated in these packs.

In spite of inserted tear-open threads, this form of packaging is not always perceived as practical or comfortable by the end user, since the tear-open thread or its punched-out easy-open tab is frequently hard to identify and grasp. Another negative aspect of the opening of articles wrapped with thin BoPP films and having tear-out threads is that the film fragments produced are often very small and therefore not very convenient to dispose of owing to the haphazard tear line, specifically in particular if small film pieces become electrostatically charged in office air with a relatively low humidity. In view of the aging population in many nations combined with an increasing deterioration in visual acuity, packaging which is safe and convenient to remove is of increasing interest.

The removal of the film wrap by means of such tear-out threads is thus not always successful. If the film wrap is not removed by means of the tear-out thread, the film must be removed in another way, for example by means of scissors or a knife, which can result in damage to the self-adhesive note pad and thus in further frustration for the user. Sometimes, these film wraps are also partially perforated in order to be able to open and remove the film in a more user-friendly manner.

Another advantage of the use of film wraps of plastic for self-adhesive note pads and multipacks of such pads is that the film wraps not only can serve as communication means. The high transparency of these films also makes it possible to identify the shape and color of the self-adhesive notes and possibly to utilise the self-adhesive notes as a further communication means for trade marks or for the function of the self-adhesive note, for example if the self-adhesive note is in the form of a self-adhesive strip and specifies that a document provided with the self-adhesive note must be signed at the marked location.

Another reason for why it is commercially routine for self-adhesive notes to be wrapped in thin BoPP films is that these films constitute an optically appealing type of packaging that is reliable in terms of the protective effect and in addition is very cost-effective. Although typically each individual small self-adhesive note pad must be wrapped in film and then additionally, for example, 2 to 20 pads packaged in this way must in turn be wrapped in heat-sealable film as a multipack, modern wrapping machines can accomplish this with a very high speed of up to 240 units per minute. Because typically BoPP films with a thickness of less than 30 µm are used, it is advantageous for the proportion of packaging film to be relatively low with respect to the amount of wrapped goods.

As an alternative to the use of film wraps, self-adhesive note pads can be blister packed (that is to say in a two-part packaging with a hard covering film) or packaged in tubular bags (not based on plastics films). The use of these packaging materials, however, is considerably more complex than is the case for BoPP films.

Self-adhesive note pads and multipacks of such pads without a film wrap, which are supplied for example in the form of a stack of pads in smaller cardboard boxes, are also known. However, such a procedure is disadvantageous because such packaging of cardboard with plug-in tabs is not completely impermeable to dust and it is not possible to detect initial opening. Moreover, the actual product, that is the individual pad, can only be seen through additional openings in the box, which further reduce the protective effect. Owing to the considerably higher material thickness of the packaging, in this way it is also not possible to package the individual pads (or such packaging would be associated with an additional and very high material outlay). Furthermore, packaging machines that insert goods in boxes have a considerably more complex structure than machines that wrap products in plastics film. As an alternative, cardboard packaging can of course be manually filled, although the costs incurred in terms of personnel must be taken into account and in any case are not inconsiderable.

Finally, plastics films can indeed be collected and sorted. However, the recycling of plastics films from post-consumer waste is very complex, among other things owing to the wide variety of plastics used in different films and the fact that modern films only rarely consist of only one type of plastic. Therefore, films that have been produced using post-consumer waste also generally do not make it possible to obtain the properties necessary for higher-quality applications. A further disadvantage of plastics films is that, although they break down very slowly into smaller particles under the action of UV light (if not disposed of properly), these particles are specifically detrimental to animals and the environment.

The present invention is therefore based on the object of providing materials for wrapping self-adhesive note pads and multipacks of such pads and also corresponding wrapping methods which do not have the disadvantages described. The wrapping materials and methods should not require complex conversions of the existing wrapping methods.

It has surprisingly been found that a wrapping material which is produced on the basis of glassine paper with a low grammage in the range of 25 to 50 g/m$^2$ can be produced easily and used for wrapping articles such as self-adhesive notes. Such glassine paper can be used on fast-running wrapping machines. In spite of the very low amount of heat-sealable coating required according to the invention, it provides a stable and printable wrap.

Glassine papers and their production are known to those skilled in the art. The glassine paper used according to the invention with a particularly low grammage not only can be ideally worked but also enables lower opacity, down to simple transparency. On the basis of the principle, when the transparency is increased by intense calendering, the structural strength, which is already rather low from the outset, of glassine papers that are produced on the basis of particularly finely ground fibers and have a low grammage is further reduced, with the result that the comparatively low bursting strength of the thin, transparent glassine papers would not make it possible to expect such papers to be suitable as wrapping material in fast-running wrapping methods.

In a first aspect, the invention relates to a wrapping material based on glassine paper for wrapping an article.

In a second aspect, the invention relates to the use of the wrapping material according to the first aspect for wrapping an article made of a coated and paper-based material.

In a third aspect, the invention relates to a method for producing the wrapping material according to the first aspect.

In a fourth aspect, the invention relates to a method for wrapping an article.

In a fifth aspect, the invention relates to the wrapped article.

The invention is based, among other things, on the fact that it has surprisingly been found that the wrapping material used according to the invention is conducive to the interest in more environmentally friendly types of packaging and in particular follows the trend of generally avoiding disposable packaging of plastic. In addition, a) the wrapping material has an attractive appearance and makes it possible, if desired and a transparent glassine paper is used, to identify the wrapped article (through the wrapping material), b) the wrapping material can be worked efficiently on conventional packaging machines as are used for film wraps of plastic, c) the wrapping material offers secure protection during transport and against contamination similar to the plastics film wrap, and d) the wrapping material offers better moisture management for the wrapped article in that a possibly higher or lower humidity of the wrapped article, with respect to the surrounding area, owing to the improved capability of the glassine paper to diffuse (compared to film wraps of polyolefin plastics) can be compensated.

Conventional papers are one of the oldest known packaging materials. They have the great advantage over films that they can generally be ideally fed for reuse via established waste paper collection. It was surprising that specially the wrapping material used according to the invention can be used, because paper that is usually used for the packaging does not meet the aforementioned requirements for mechanical wrapping in many respects. Thus, the flexibility and shape-conformance of the wrapping material are very important properties if the use of fast-running film wrapping machines for wrapping relatively small articles is desired. Also required are flexural rigidities which are as low as possible, in order that the wrapped article is tightly enclosed and the wrapping material can be transported inside the wrapping machine via rollers without problems. At the same time, wrapping machines need the wrapping material used to have a high bursting strength, because the wrapping material, in particular when it first makes contact with the article to be wrapped, can be easily damaged by the sharp corners of the article, as is the case for self-adhesive note pads. In terms of these properties, many plastics outclass conventional papers, since plastics films have much higher elongation at break values. Surprisingly, the glassine paper used according to the invention with a low grammage in the range of 25 to 50 g/m$^2$ does not have these disadvantages and runs excellently on the wrapping machines conventionally used for the film wrap, specifically also at a very high speed. The fact that such glassine paper can be worked on the machines usually used for the film wrap, specifically when a heat-sealable coating is used for the wrapping according to the invention, was also surprising, therefore, because the usual use of glassine paper involves gluing it, which usually excludes high speeds of the wrapping machine because a specific drying time cannot be undershot. Although still higher speeds are sometimes possible in the case of machines for, for example, the production of pouches comprising or made of glassine paper, this is possible only because no mechanical loading is applied to the gluing location directly after the gluing step. By contrast, in the case of the wrapping according to the invention of articles, it is already imperative that the sealed bond is directly mechanically stable and withstands the restoring force of the glassine paper.

BRIEF DESCRIPTION OF THE FIGURES

Preferred embodiments of the invention will now be described with reference to the drawings. Parts that are the same or have the same function are provided with the same reference signs.

DETAILED DESCRIPTION OF THE INVENTION

Figure 1A:
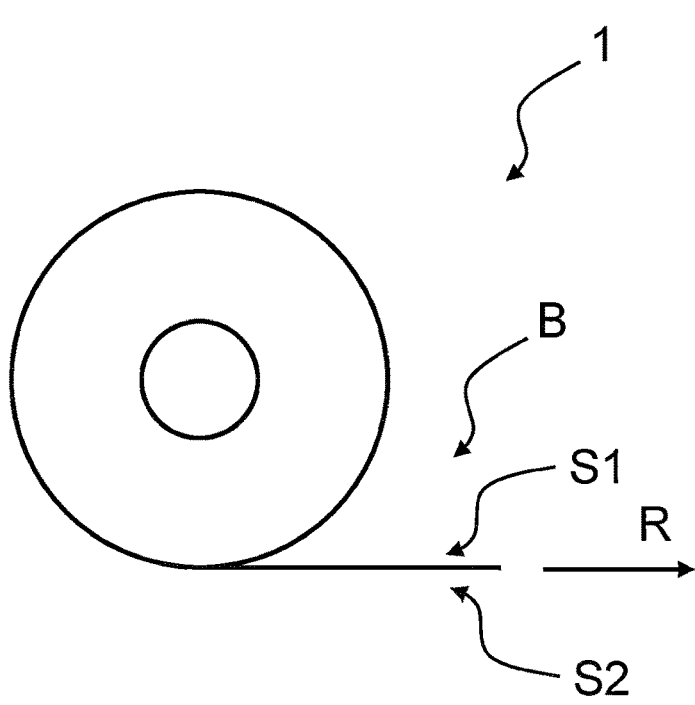
FIG. 1*a* shows a side view of one embodiment of the wrapping material according to the invention, which is present in the form of a rolled-up web.

A first aspect of the invention relates to a wrapping material based on glassine paper for wrapping an article, specifically in particular an article made of a coated and paper-based material. The wrapping material is present in the form of a web. The web has i. a first side face, ii. a second side face situated opposite the first side face, iii. at least one web portion with a first and a second outer region portion and inner region portions.

The inner region portions are arranged between the outer region portions, wherein 1) a heat-sealable coating is applied to the glassine paper on at least one of the two side faces in at least one first outer coating region in the first outer region portion of the web portion, and 2) a heat-sealable coating is applied to the glassine paper on at least one of the two side faces in at least one second outer coating region in the second outer region portion of the web portion.

The glassine paper used is characterized by a grammage (measured in the conditioned state of the samples at 23° C./50% RH) in the range of 25 to 50 g/m$^2$.

A web portion preferably has at least four inner region portions and particularly preferably at least five inner region portions. The inner region portions are arranged next to one another in the web direction. A web portion starts with a first inner region portion and ends with a last inner region portion. Between the first and the last inner region portion, preferably at least two and particularly preferably at least three inner region portions are arranged.

In a typical embodiment of the invention, which is suitable for wrapping an article with a rectangular cross section, four inner region portions are present. In this embodiment, when the article has been wrapped, the first inner region portion of the web portion does not overlap the last inner region portion. For example, such an embodiment without overlapping inner region portions is suitable if an individual self-adhesive note pad is wrapped.

In a preferred embodiment, which is particularly suitable for wrapping an article with a rectangular cross section, five inner region portions are present. In this embodiment, when the article has been wrapped, the first inner region portion overlaps the last inner region portion. In this embodiment, the first inner region portion and the last inner region portion are preferably connected to one another in one or more inner coating regions by hot sealing. For example, such an embodiment with overlapping inner coating regions (preferably connected by hot sealing) of the first and last inner region portions is particularly suitable if a multipack (from 2 to 20 self-adhesive note pads) is wrapped.

The inner region portions are preferably rectangular or square. The inner region portions extend along the web direction with a length and perpendicularly in relation to the web direction with a width. All inner region portions preferably have the same width. Adjacently arranged inner region portions, by contrast, generally have different lengths. The first inner region portion and the last inner region portion preferably have the same length. Two inner region portions arranged between the first and the last inner region portion preferably have a length which corresponds to the width of the inner region portions.

The wrapping material is preferably present in the form of a rolled-up web. Typically, the length of the web, composed of the individual web portions, is in the range of 500 to 5000 m, preferably in the range of 1000 to 2000 m. A wrapping material according to the invention which is present in the form of a rolled-up web is particularly advantageous because such a web, after it has been produced by applying and drying the heat-sealable coating (and optionally the printed markings), can be stored in the form of a roll without problems, specifically without a separating layer needing to be inserted between the individual layers of the rolled-up web. Wrapping material according to the invention produced in this way is then used in the method according to the invention as per the fourth aspect and can be changed without problems, depending on the desired packaging for the specific article. The wrapping material according to the invention does not block up in the rolled-up state in normal ambient conditions.

As an alternative, it is possible to produce a wrapping material according to the invention in-line, by creating at least one web portion on a web of glassine paper by applying the heat-sealable coating and then wrapping the article according to the method of the fourth aspect of the invention.

Glassine Paper

The production of glassine paper is explained, for example, in "*Encyclopedia of Polymer Science and Technology*" (vol. 9, John Wiley, 1968, page 719). Suitable glassine papers are sold in bleached or unbleached form. Glassine paper is produced from particularly finely ground pulp. Its high transparency is obtained by what is referred to as a high level of satinization, i.e. by pronounced smoothing and pressing. Suitable glassine papers are preferably smoothed on both sides. Here, the satinization is performed evenly in a calender by a rolling operation.

The glassine paper used according to the invention in all embodiments of the invention is characterized by a grammage g (DIN EN ISO 536:2020-05 Papier und Pappe—Bestimmung der flächenbezogenen Masse [Paper and board—Determination of grammage] (ISO 536:2019); German version EN ISO 536:2020, measured in the conditioned state of the samples at 23° ° C./50% RH) in the range of 25 to 50 g/m$^2$, preferably in the range of 28 to 50 g/m$^2$, in particular in the range of 30 to 50 g/m$^2$, such as in the range of 32 to 45 g/m$^2$.

The glassine paper used according to the invention is moreover preferably characterized by a mean individual sheet thickness (EN ISO 534:2011 with 100 kPa applied pressure and a measurement surface area of 200 mm$^2$; measured in the conditioned state of the samples at 23° C./50% RH; measured in the stack of 10 sheets according to 9.3.3) in the range of 25 to 80 μm, preferably in the range of 30 to 70 μm, in particular in the range of 30 to 45 μm.

The glassine paper used according to the invention is also preferably characterized by a width-based breaking force σ in the longitudinal direction (DIN EN ISO 1924-2:2009-05 Papier und Pappe—Bestimmung von Eigenschaften bei Zugbeanspruchung—Teil 2: Verfahren mit konstanter Dehngeschwindigkeit [Paper and board—Determination of tensile properties—part 2: constant rate of elongation method] (20 mm/min), measured in the conditioned state of the samples at 23° C./50% RH) of at least 1.3 kN/m, preferably at least 1.6 kN/m, in particular at least 2 kN/m.

The glassine paper used according to the invention is moreover preferably characterized by a bursting strength p (EN ISO 2758:2014, measured in the conditioned state of the samples at 23° C./50% RH, in a Truburst2 appliance from Carl von Gehlen—Spezialmaschinen und Zubehör GmbH & Co. KG, Mönchengladbach, Germany) of at least 60 kPa, preferably at least 65 kPa, in particular at least 70 kPa.

The glassine paper used according to the invention is moreover preferably characterized by a transparency T (DIN 53147: 1993; measured with D65/0° of at least 50%, preferably at least 60%, in particular at least 70%.

According to the invention, the aforementioned object is achieved in particular by glassine paper having a transparency T of at least 70 and a grammage of 30 to 50 g/m², in particular 32 to 45 g/m², which is provided on one side or both sides with a heat-sealable coating having a special printed image such that it can be worked on conventional machines for film wrap (for example Petri WR 200 or W-350 from Petri Verpackungstechnik GmbH or SOLLAS SE from Sollas Holland BV).

In the most general preferred embodiment, the glassine paper is defined solely by the grammage and the thickness. The transparency is an additional aspect which is linked to particular advantages according to the invention.

Heat-Sealable Coating

According to the invention, the heat-sealable coating is preferably applied in the form of a water-based or solvent-based, heat-sealable-material-containing lacquer.

In the case of a solvent-based heat-sealable lacquer, the heat-sealable material of the heat-sealable coating is preferably a vinyl chloride copolymer or a vinyl chloride terpolymer, in particular a vinyl chloride-vinyl acetate copolymer. Exemplary solvent-based heat-sealable lacquers are supplied by Wacker Chemie AG, Munich, Germany under the trade name VINNOL®. The heat-sealable-material basis of such heat-sealable lacquers is for example primary heat-sealable-material film-forming resins comprising carboxyl groups, specifically terpolymers of vinyl chloride, vinyl acetate and dicarboxylic acids. VINNOL® resins without functional groups are copolymers of vinyl chloride and vinyl acetate. In hot-sealing applications, VINNOL® H grades are mainly used. VINNOL® H grades are produced by means of suspension polymerization. They make it possible to formulate highly transparent coatings with a low water uptake—this being especially important for heat-sealable lacquers.

Preferably, however, a water-based heat-sealable-material-containing lacquer is used. It is possible, for example, to use heat-sealable lacquers based on ethylene-vinyl acetate copolymers for producing the heat-sealable coating. It is possible, for example to use heat-sealable lacquers from DOW, for example a water-based product comprising ethylene-vinyl acetate copolymer as heat-sealable material (such as ADCOTE™ 37 P 295 E Water-Borne Adhesive).

In a preferred embodiment, the heat-sealable lacquer is applied in an amount in the range of 5 to 30 g/m², preferably in the range of 6 to 20 g/m², in particular in the range of 7 to 16 g/m², such as in the range of 8 to 14 g/m². These specifications relate to the amount of heat-sealable lacquer in the wet state. The heat-sealable lacquer may for example be applied to the glassine paper by gravure printing or flexographic printing.

In a preferred embodiment, the amount of heat-sealable coating applied in the case of the wrapping material according to the invention is in the range of 2 to 12 g/m², preferably in the range of 2.5 to 8 g/m², in particular in the range of 3 to 7 g/m², such as in the range of 4 to 6 g/m². These specifications relate to the amount of heat-sealable coating in the dry state (specifically under the conditions for determining the grammage of the glassine paper).

The heat-sealable coating used according to the invention preferably has a heat activation temperature in the range of 70 to 110° C., preferably in the range of 80 to 100° C.

Preferably, at least the first one of the two side faces in at least one first outer coating region has a heat-sealable coating on the glassine paper in the first outer region portion of the web portion, and at least the first one of the two side faces in at least one first outer coating region has a heat-sealable coating on the glassine paper in the second outer region portion of the web portion.

Preferably, at least one first outer coating region has a heat-sealable coating on the glassine paper in the first outer region portion of the web portion on each of the two side faces, and at least one second outer coating region has a heat-sealable coating on the glassine paper in the second outer region portion of the web portion on each of the two side faces. Preferably, both side faces of the glassine paper are provided with the heat-sealable coating in the first outer region portion of the web portion in at least one first coating region, and both side faces of the glassine paper are provided with the heat-sealable coating in the second outer region portion of the web portion in at least one second outer coating region.

Preferably, not all of the surface area of the first outer region portion and not all of the second outer region portion has a heat-sealable coating on the glassine paper, even though only one respective side of the respective outer region portion has a coating of the glassine paper comprising the heat-sealable coating in the outer coating regions at all. Such a coating over the entire surface area of the respective outer region portion of the glassine paper with the heat-sealable coating is not necessary in order to completely and securely wrap the article and prevent the web region actually detaching from the wrapping material already when the wrapped article is being transported. By contrast, an only partial coating of the first outer region portion and the second outer region portion on only one side can make is easier for the end user to be able to easily remove the web region of wrapping material from the wrapped article according to the fifth aspect of the invention and to feed it for waste paper collection.

It should be understood that, in the first outer region portion of the web portion, in the case of which on each of the two side faces at least one first outer coating region has a heat-sealable coating on the glassine paper, a first outer coating region of the glassine paper can be provided with the heat-sealable coating on the first side face that differs from the first outer coating region in which the second side face has a heat-sealable coating on the glassine paper. This is to be understood correspondingly for the second outer region portion of the web portion. That is, in the second outer region portion of the web portion, in the case of which on each of the two side faces at least one second outer coating region has a heat-sealable coating on the glassine paper, a second outer coating region of the glassine paper can be provided with the heat-sealable coating on the first side face that differs from the second outer coating region in which the second side face has a heat-sealable coating on the glassine paper.

The coating of the glassine paper with the heat-sealable coating in the first outer region portion of the web portion and the coating of the glassine paper with the heat-sealable coating in the second outer region portion of the web portion are preferably mirror-symmetrical with respect to the center of the web portion and a mirror plane perpendicular to the web.

The wrapping material is preferably characterized in that the first or the last inner region portion of the web portion, or both, has a heat-sealable coating on the glassine paper in at least one first inner coating region, wherein preferably the first or the last inner region portion of the web portion, or both, has a heat-sealable coating on the glassine paper in at least one second inner coating region.

The wrapping material according to the invention preferably does not have a heat-sealable coating over its entire surface area on the first or the second side.

The first inner region portion and the last inner region portion are preferably provided with the heat-sealable coating on different side faces. Thus, for example, the first inner region portion can be provided with the heat-sealable coating in at least one first inner coating region of the glassine paper on the first side face and the last inner region portion of the glassine paper can be provided with the heat-sealable coating in at least one second inner coating region of the glassine paper on the second side face.

A coating also in inner region portions is initially advantageous for the further transport of the partially wrapped article in the case of the method according to the fourth aspect of the invention, for example when, upon wrapping, coating regions of the first and the last inner region portion of the web portion are connected to one another or to uncoated regions of the first and the last inner region portion of the web portion by hot sealing, while only in a later step, that is after folding the two outer region portions, are the coated regions in the first outer region portion (the second outer coating region) connected to one another or to uncoated regions in the first outer coating region (second outer coating region) by hot sealing.

A preferred wrapping material according to the invention is characterized in that a polygonal surface portion of the first side face has a heat-sealable coating on the glassine paper in at least one first outer coating region of the web portion and a polygonal surface portion of the first side face has a heat-sealable coating on the glassine paper in a second outer coating region of the web portion. Particularly preferably, a polygonal surface portion of the side faces is provided with the heat-sealable coating in at least one first outer coating region of the web portion and a polygonal surface portion of the side faces of the glassine paper is provided with the heat-sealable coating in a second outer coating region of the web portion.

The wrapping material is preferably characterized in that a polygonal surface portion of the first side face has a heat-sealable coating on the glassine paper in at least one first inner coating region of the web portion.

The wrapping material further preferably has a polygonal surface portion of the second side face that is provided with the heat-sealable coating on the glassine paper in at least one first inner coating region of the web portion.

Furthermore, the wrapping material preferably has a heat-sealable coating on the glassine paper in at least one second inner coating region of the web portion on a polygonal surface portion of the first side face.

Moreover, the wrapping material preferably has a heat-sealable coating on the glassine paper in at least one second inner coating region of the web portion on a polygonal surface portion of the second side face.

Furthermore, the polygonal surface portion is preferably in the form of a quadrangular surface portion, a L-shaped surface portion, a combination of quadrangular surface portions, a combination of triangular surface portions or a combination of quadrangular surface portions and triangular surface portions.

In all embodiments of the invention, the wrapping material is preferably printed, wherein the wrapping material is preferably printed in at least one information region at least in one of the inner region portions of the web portion.

The wrapping material is preferably printed in at least one information region on each side that is on the outside when the wrapped article is wrapped in the wrapping material.

Moreover, the wrapping material according to the invention is preferably characterized in that the web portion has at least one printed mark for controlling the wrapping method, wherein the printed mark is preferably arranged in one of the outer region portions. The printed mark is particularly preferably applied in the outer region portion such that, in the course of the wrapping method according to the fourth aspect of the invention, the article first of all comes into contact with that side of the web portion that is not characterized by the printed mark (the printed mark is thus on the other side). Suitable folding then preferably ensures that the printed mark is on the outside of the wrapped article, as a result of which the method according to the invention as per the fourth aspect and the subsequent further transport of the wrapped article can be controlled in a suitable way (that is, the printed mark is not covered by one or more layers of glassine paper).

In a second aspect, the invention relates to the use of the wrapping material for wrapping an article made of a coated and paper-based material. The article is preferably a self-adhesive note pad or a multipack of 2 to 20 self-adhesive note pads.

The at least partial transparency of the wrapping material (based on glassine paper) used according to the invention ensures that visually perceptible properties of the article can also be perceived sufficiently in the wrapped state according to the fifth aspect of the invention, wherein the visually perceptible property is, for example, the color of the article, or a label for the uppermost sheet of the article, or the side edge of the article, or a combination of such visually perceptible properties.

The multipack preferably comprises self-adhesive note pads with the same color or with different colors, or the self-adhesive note pad has one or more substacks with differently colored layers.

The self-adhesive note pad is preferably a pad of self-adhesive strips, and in particular the pad of self-adhesive strips is at least partially encapsulated by a protective element made of cardboard.

The uppermost sheet of the article is preferably labeled.

The self-adhesive note pad or the self-adhesive note pad of the multipack is preferably a layer comprising 20 to 550 individual sheets of notes, in particular 45 to 525 notes.

In a third aspect, the invention relates to a method for producing the wrapping material, the method comprising:

providing a web of glassine paper having a first side face and a second side face situated opposite the first side face and coating the glassine paper with the heat-sealable coating on at least one of the two side faces in at least one first outer coating region in a first outer region portion of the web portion, and on at least one of the two side faces in at least one second outer coating region in a second outer region portion of the web portion.

In a fourth aspect, the invention relates to a method for wrapping an article made of a coated and paper-based material in a wrapping material according to the first aspect, wherein the method comprises the following steps:

providing the wrapping material according to the first aspect in the form of a web, feeding the wrapping material to a separating device, cutting a web portion of the web to a defined packaging length of the wrapping material by means of the separating device, arranging the cut-to-length web portion perpendicularly in relation to a conveying direction of the article to be wrapped, inserting the article to be wrapped between two plates of a wrapping device in the conveying direction perpendicularly in relation to the cut-to-length web portion and wrapping the cut-to-length web portion by means of the wrapping device, folding the first and the second outer region portion of the cut-to-length web portion by means of a folding device, and longitudinally sealing the wrapped first and second outer region portions by means of a longitudinal-sealing device.

In the case of the method according to the fourth aspect, the web is preferably provided in the form of a rolled-up web, wherein the roll has multiple region portions.

As an alternative, it is possible to provide glassine paper (for example unroll it from a roll) and to produce at least one region portion in-line by applying a heat-sealable coating to the glassine paper, wherein the article is wrapped in this region portion—after the latter is cut to length.

The two plates of the wrapping device are preferably pressing plates.

The folding device for folding the first and the second outer region portion of the cut-to-length web portion typically has a left-hand and a right-hand part, as seen in the conveying direction of the partially wrapped article.

The longitudinal-sealing device for longitudinally sealing the wrapped first and second outer region portions typically has a left-hand and a right-hand part, as seen in the conveying direction of the partially wrapped article.

The method according to the fourth aspect preferably comprises the following step: end sealing the cut-to-length web portion, wrapped around the article, transversely to the conveying direction by means of an end-sealing device. This step preferably takes place after the cut-to-length web portion has been wrapped by means of the wrapping device and before the first and the second outer region portion of the cut-to-length web portion have been folded by means of the folding device.

The method according to the fourth aspect also preferably comprises the following step: perforating the wrapping material in the longitudinal direction. The perforating method step is performed for example by a rotating toothed wheel or a circular saw blade.

The method according to the fourth aspect also preferably comprises the following step: creating an opening tab in the wrapping material. This step preferably takes place before the cutting to length operation.

Sealing, in particular longitudinal sealing of the outer coating regions and/or end sealing, of the glassine paper used according to the invention is carried out during the method for wrapping an article preferably at a temperature in a range of 140° ° C. to 230°, preferably in a range of 160° ° C. to 210° C. (the temperature of the sealing jaws is specified), at a contact pressure in a range of 1 bar to 10 bar, preferably in a range of 4 bar to 7 bar, for a duration in a range of 0 s to 4 s, preferably in a range of 0.1 s to 0.5 s.

If the wrapping material is present in the form of a roll, it is for example unrolled by means of a motor-driven conveying roller and fed to the separating device.

The separating device can cut the wrapping material to length for example by means of blades, wherein use is preferably made of rotary blades or swinging blades.

The end-sealing device and the longitudinal-sealing device can comprise heatable heating elements which can be heated to the respectively desired sealing temperature.

The articles to be wrapped are transported to the device for the method according to the fourth aspect of the invention and transported in the conveying direction in this device for example by means of roller conveyors and/or belt conveyors. Exemplary devices (wrapping machines) are produced by Petri Verpackungstechnik GmbH (Löhne, Germany, WJ350 and WR200) and Sollas Holland BV (Wormer, Netherlands).

In a fifth aspect, the invention relates to a wrapped article made of a coated and paper-based material, which is wrapped in a web portion of the wrapping material according to the first aspect. The article is preferably produced by the method according to the fourth aspect.

The invention will be described below with reference to various embodiments.

Figure 1B:
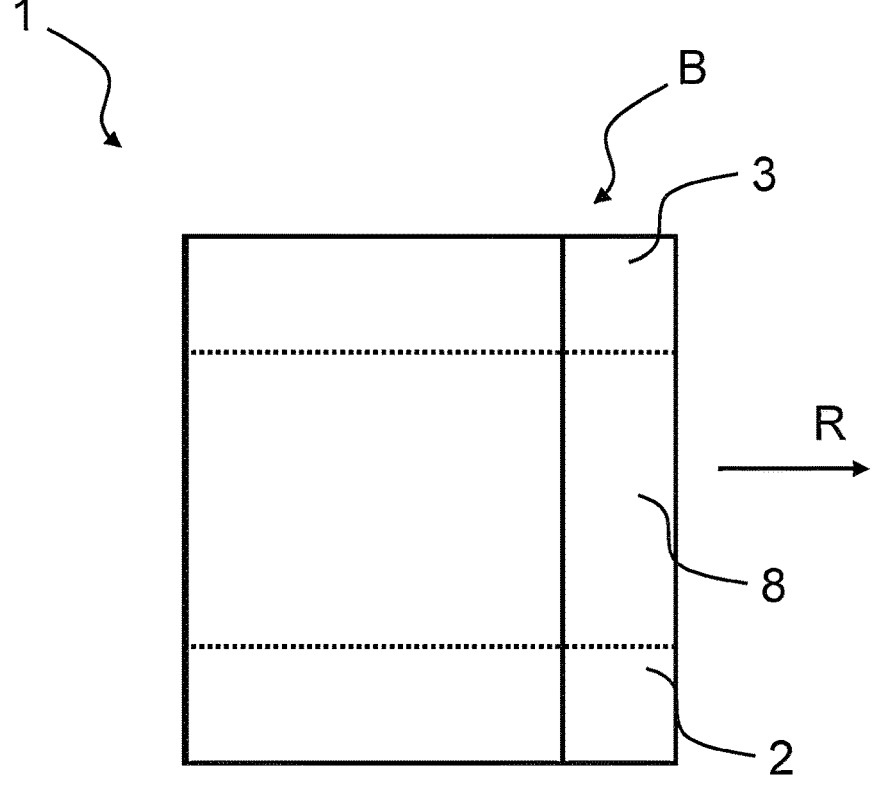
FIG. 1*b* shows a plan view of the rolled-up web of the wrapping material illustrated in FIG. 1*a;*

FIG. 1a shows a side view and FIG. 1b shows a plan view of one embodiment of the wrapping material 1 according to the invention, which is present in the form of a rolled-up web. The wrapping material 1 according to the invention is based on glassine paper and is at least partially provided with a heat-sealable coating. In the present case, the glassine paper is at least partially coated with an amount of heat-sealable coating in the range of 2 to 8 g/m², the heat activation temperature of which is in the range of 70° C. to 110° C. Heat-sealable lacquers considered for the production of the heat-sealable coating are preferably water-based lacquers, which comprise for example ethylene-vinyl acetate copolymer as heat-sealable material. The wrapping material 1 according to the invention makes it possible to wrap articles 10 made of a coated and paper-based material. Such articles 10 are, for example, self-adhesive note pads or multipacks of 2 to 20 self-adhesive note pads. Self-adhesive note pads may in particular also be pads of self-adhesive strips, which are at least partially encapsulated by a protective element.

The embodiment of the web of the wrapping material 1 according to the invention illustrated in FIGS. 1a and 1b has a first side face S1 and a second side face S2 situated opposite the first side face S1. Such a web has multiple web portions B, B' arranged one after another in a web direction R. Generally, these web portions B, B' of the web have identical forms.

FIGS. 2 to 7 show a detail of a web with two web portions B, B'. In the embodiments illustrated, a second web portion B follows a first web portion B' in the web direction R. The details of the web show particularly preferred alternative exemplary embodiments of the web portions B of the wrapping material 1.

The web portions B, B' of the wrapping material 1 illustrated in FIGS. 2 to 7 have a first and a second outer region portion 2, 2', 3, 3' and multiple inner region portions 4, 5, 6, 7, 8, 4'. The inner region portions 4, 5, 6, 7, 8, 4' are arranged one after another in the stated sequence in the web direction R. In the web direction R, a web portion B starts with a first inner region portion 4, 4' and ends with a last inner region portion 8. Generally at least two, but preferably three inner region portions 5, 6, 7 are arranged between the first inner region portion 4 and the last inner region portion 8. The inner region portions 4, 5, 6, 7, 8, 4' of a web portion B, B' are arranged between the first and the second outer region portion 2, 2', 3, 3' perpendicularly in relation to the web direction R.

The wrapping material 1 according to the invention that is illustrated in FIGS. 2 to 7 is provided with the heat-sealable coating at least in subregions on at least one of the two side faces S1, S2 in the first outer region portion 2 and the second outer region portion 3 of the web portion B. In the first outer region portion 2 of the web, the subregion is at least one first outer coating region 2a-2g and in the second outer region portion 3 of the web it is at least one second outer coating region 3a-3g.

Figure 2:
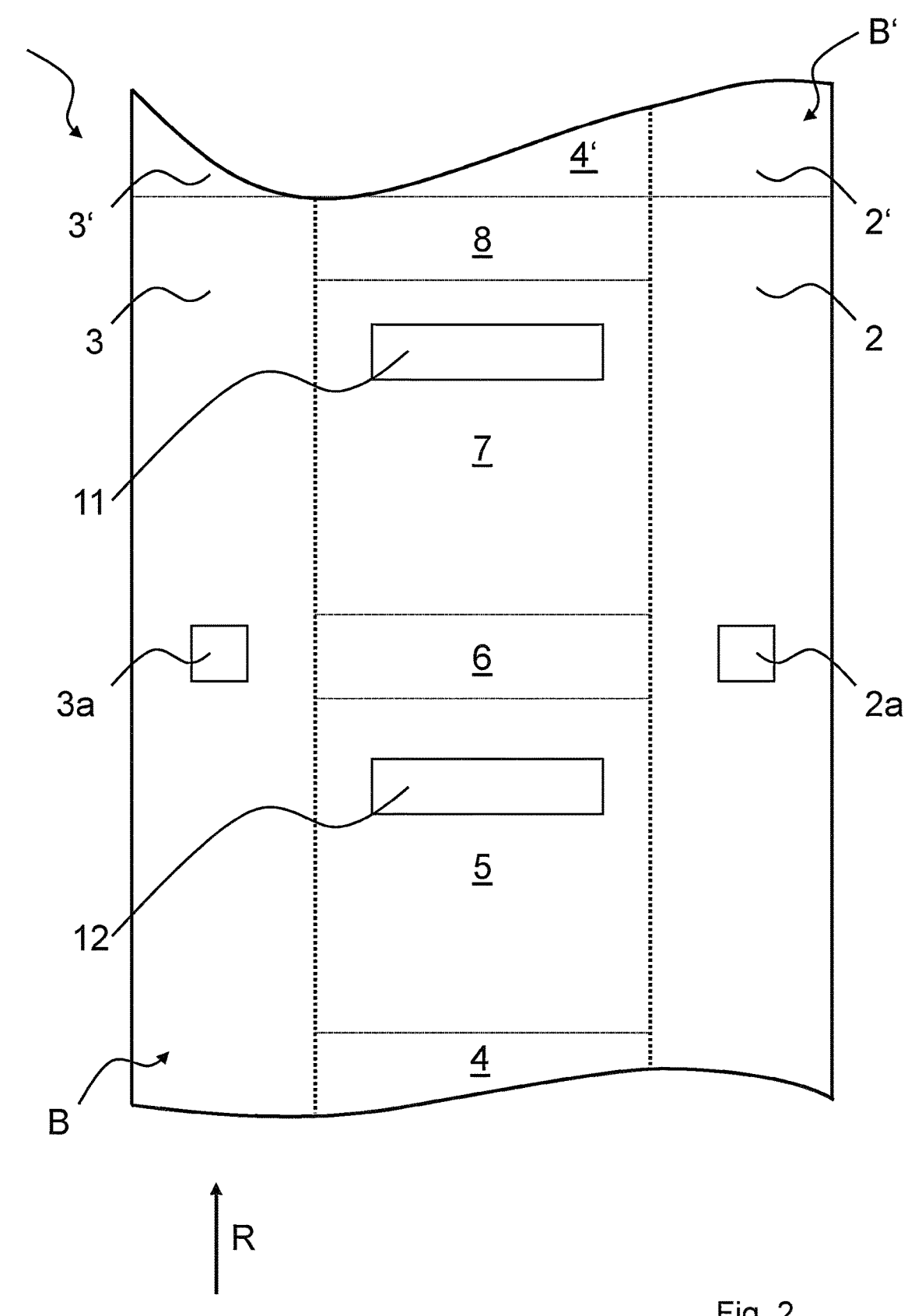
FIG. 2 shows a plan view of a first embodiment of a wrapping material according to the invention.

FIG. 2 shows a first preferred embodiment of a wrapping material 1 according to the invention. A web portion B of this wrapping material 1 has a single first outer coating region 2a in the first outer region portion 2 and a single second outer coating region 3a in the second outer region portion 3. The wrapping material 1 is provided with the heat-sealable coating on the same side face in the respective outer coating region 2a, 3a in this web portion B. The heat-sealable coatings were applied in the first and the second outer region portion 2, 3 of the web portion B mirror-symmetrically with respect to a center of the web portion B and a mirror plane perpendicular to the web portion. Such a coating at certain points makes it possible to longitudinally seal an article 10 in a particularly resource-conserving manner.

Indeed, with this first embodiment, end sealing, i.e. sealing of the first inner region portion 4 to the last inner region portion 8 of a wrapped wrapping material 1 is not possible. However, such a wrapping material 1 in which an article 10 has been wrapped can be opened particularly easily on the unsealed end face.

The embodiment shown in FIG. 2 also has an information region 12 in a further inner region portion 5 and an information region 11 in a further inner region portion 7. The information regions 11, 12 are generally printed on each of the two side faces S1, S2, which later on form the outer side of a wrapped wrapping material 1 in which an article 10 is wrapped.

Figure 3:
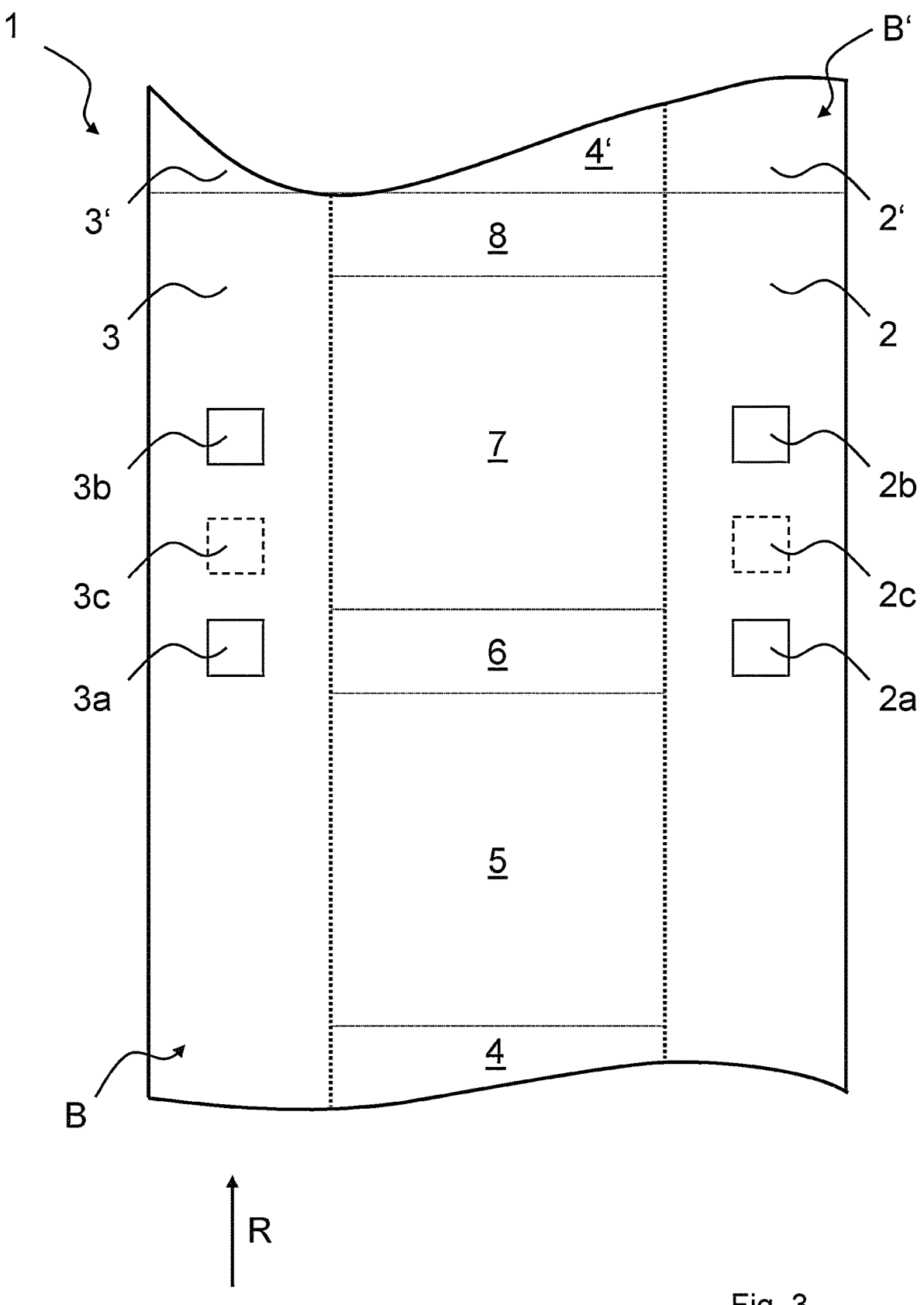
FIG. 3 shows a plan view of a second embodiment of a wrapping material according to the invention.

FIG. 3 shows a second preferred embodiment of a wrapping material 1 according to the invention. A web portion B of this wrapping material 1 has three first outer coating regions 2a-2c in the first outer region portion 2 and three second outer coating regions 3a-3c in the second outer region portion 3. In the present embodiment, the first side face S1 is provided with the heat-sealable coating in two of the three respective outer coating regions 2a, 2b, 3a, 3b both in the first and in the second outer region portion 2, 3. The second side face S2 is provided with the heat-sealable coating in a respective third first and third second outer coating region 2c, 3c both in the first and in the second outer region portion 2, 3. Compared to the first embodiment, this second embodiment enables a more stable but still resource-conserving longitudinal sealing of the article 10 with the wrapping material 1.

Figure 4:
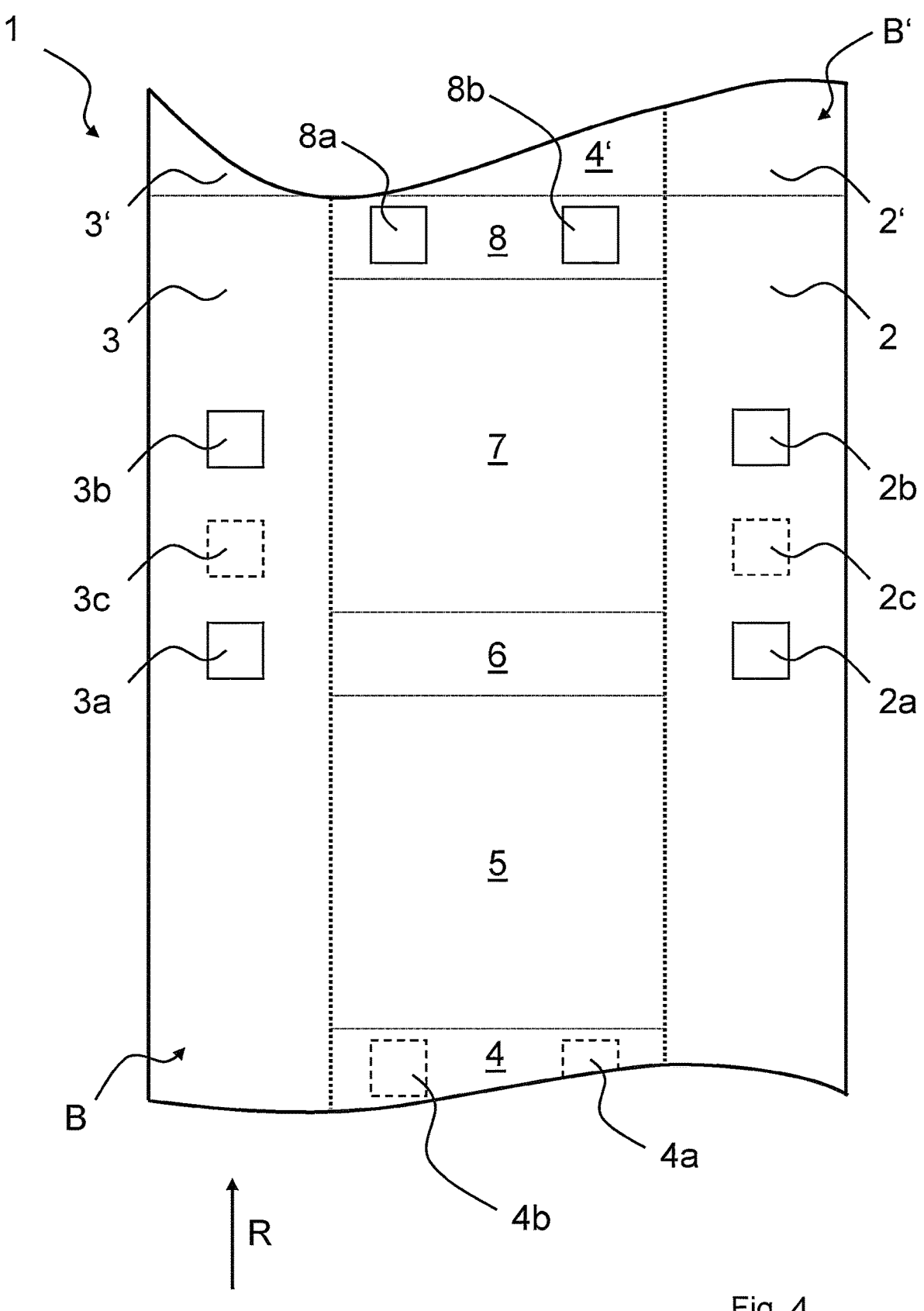
FIG. 4 shows a plan view of a third embodiment of a wrapping material according to the invention.

FIG. 4 shows a third preferred embodiment of a wrapping material 1 according to the invention, which is substantially based on the second embodiment of the wrapping material 1 according to the invention illustrated in FIG. 3. In addition, this third embodiment has two first inner coating regions 4a, 4b in the first inner region portion 4 of the web portion B and two second inner coating regions 8a, 8b in the last inner region portion 8 of the web portion B. In this case, the first side face S1 is provided with the heat-sealable coating in the two second inner coating regions 8a, 8b of the glassine paper in the last inner region portion 8; on the second side face S2, the first inner region portion 4 is provided with the heat-sealable coating in the two first inner coating regions 4a, 4b of the glassine paper. The two first inner coating regions 4a, 4b and the two second inner coating regions 8a, 8b are arranged in the respective inner region portion 4, 8 such that the first inner coating regions 4a, 4b and the second inner coating regions 8a, 8b lie one on top of the other when the web portion B of the wrapping material 1 is wrapped around an article 10 to be wrapped for end sealing purposes. The first and second inner coating regions 4a, 4b, 8a, 8b enable an additional end sealing. Such an additional end sealing increases the stability of a sealed wrapping material 1.

In the third embodiment, the two first inner coating regions 4a, 4b and also the two second inner coating regions 8a, 8b are arranged spaced apart perpendicularly in relation to the web direction R. The effect of this is that the first and the last inner region portion 4, 8 are not sealed in the middle after the end sealing. Therefore, a sealed wrapping material 1 in which an article 10 has been wrapped can be opened easily in spite of the increased stability.

Figure 5:
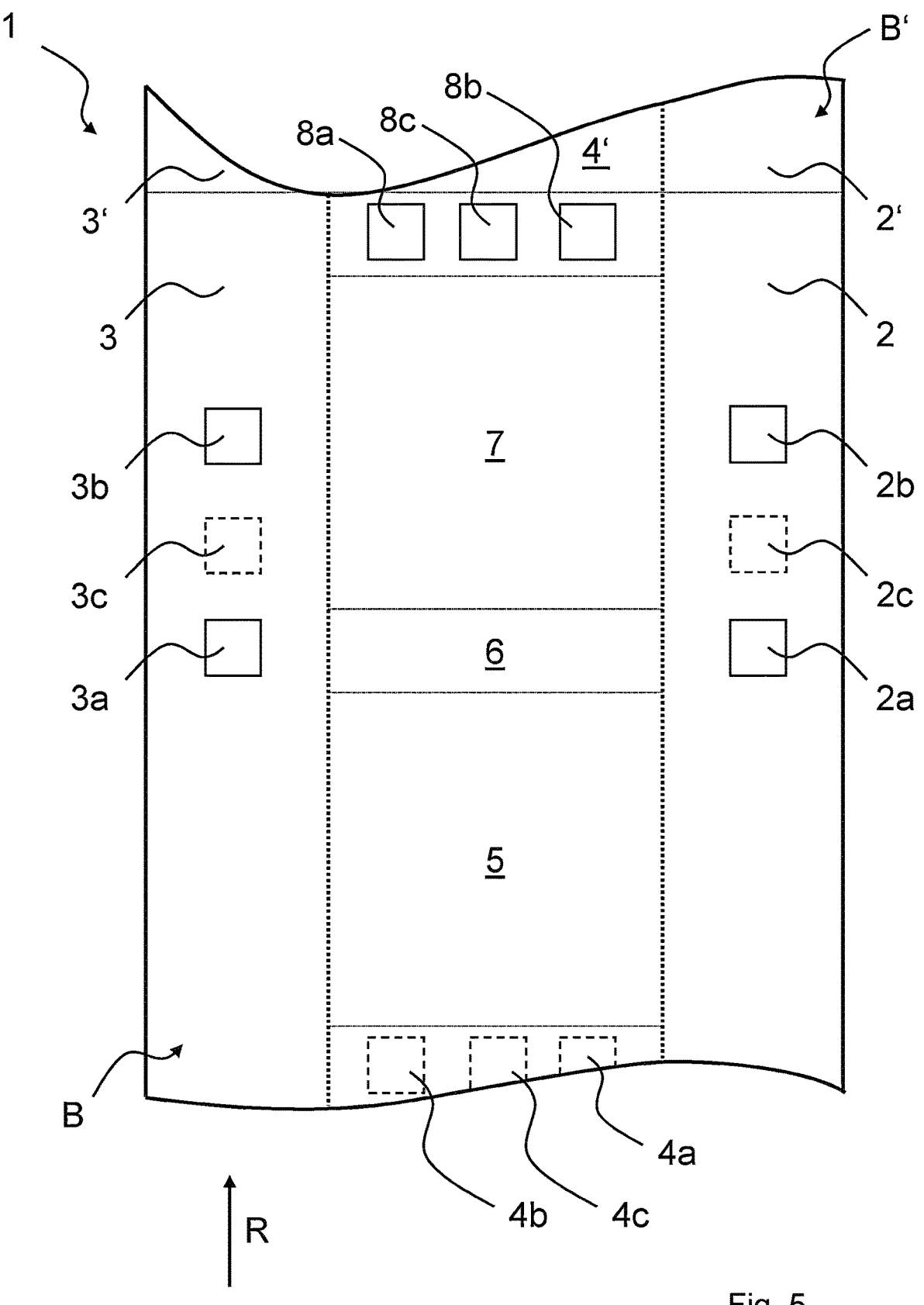
FIG. 5 shows a plan view of a fourth embodiment of a wrapping material according to the invention.

FIG. 5 shows a fourth preferred embodiment of a wrapping material 1 according to the invention, which is substantially based on the third embodiment of the wrapping material 1 according to the invention illustrated in FIG. 4. In addition, this fourth embodiment has a third first inner coating region 4c, which is arranged between the two other first inner coating regions 4a, 4b, in the first inner region portion 4 of the web portion B. Correspondingly, the fourth embodiment has a third second inner coating region 8c, which is arranged between the two other second inner coating regions 8a, 8b, in the last inner region portion 8 of the web portion B. This fourth embodiment enables a higher stability of a sealed wrapping material 1 compared to the third embodiment owing to the additional third first and third second inner coating regions 4c, 8c.

Figure 6:
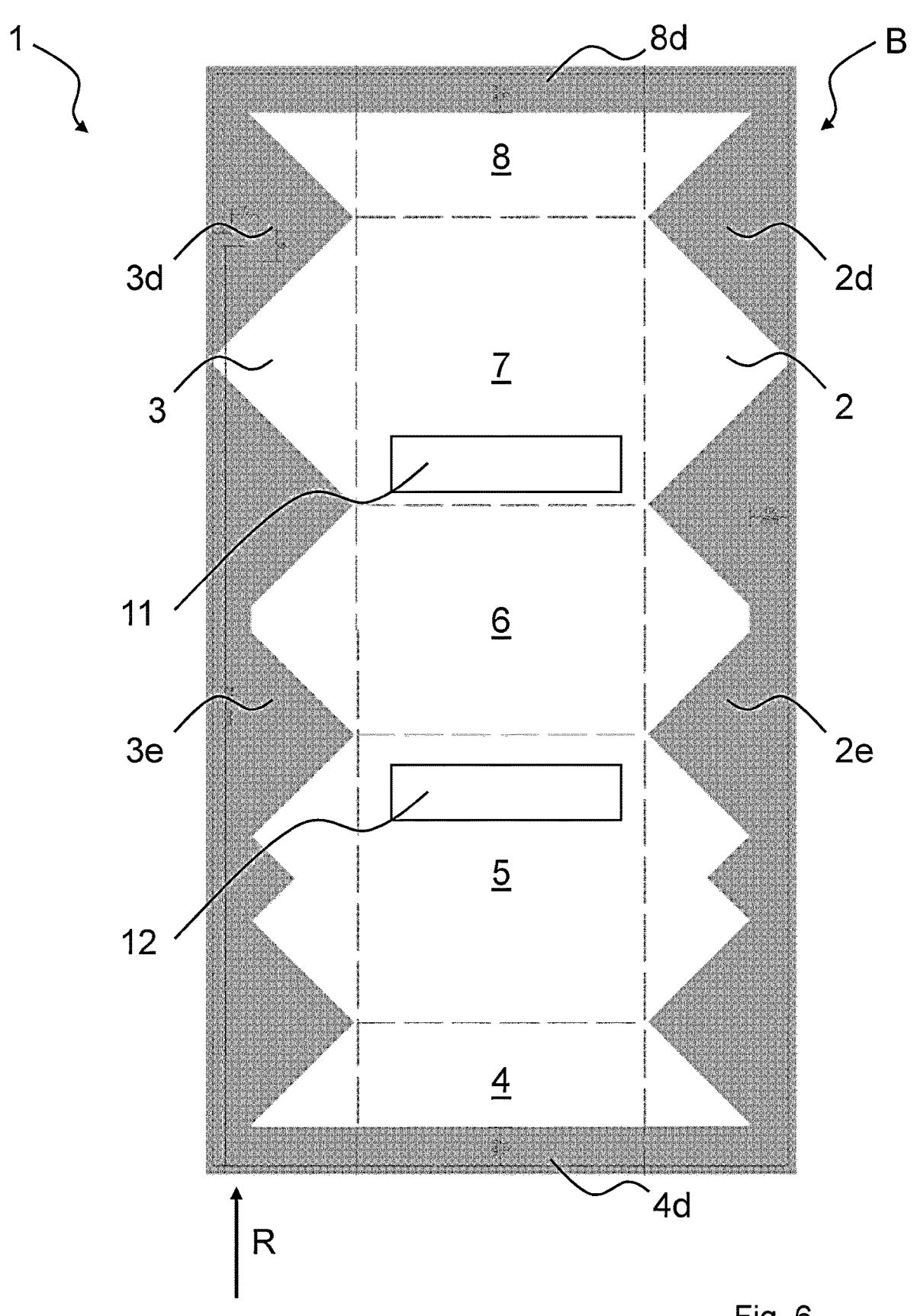
FIG. 6 shows a plan view of a fifth embodiment of a wrapping material according to the invention.

FIG. 6 shows a fifth preferred embodiment of a wrapping material 1 according to the invention. The web portion B has two first outer coating regions 2d, 2e in the first outer region portion 2. The second outer region portion 3 has two second outer coating regions 3d, 3e. The web portion is provided with the heat-sealable coating in polygonal surface portions of the glassine paper in the respective outer coating regions 2d, 2e, 3d, 3e on a first side face S1. The polygonal surface portions of the respective outer coating regions 2d, 2e, 3d, 3e are in the form of a combination of quadrangular surface portions and triangular surface portions. Both one of the two first outer coating regions 2d and one of the two second outer coating regions 3*d* are in the form of a combination of a single quadrangular surface portion and a single triangular surface portion. The other first outer coating region 2*e* and the other second outer coating region 3*e* are each in the form of a combination of two quadrangular surface portions and four quadrangular surface portions. The surface portion provided with the heat-scalable coating in the first and the second outer region portion 2, 3 of the glassine paper extends on one side along the outer edges of the web portion B and on the other side has a sawtooth-like profile along the web direction R. In the present fifth embodiment, the coating of the glassine paper with the heat-scalable coating in the first outer region portion 2 and the coating of the glassine paper with the heat-scalable coating in the second outer region portion 3 are mirror-symmetrical with respect to the center of the web portion and a mirror plane perpendicular to the web portion.

The web portion B of the fifth embodiment has a first inner coating region 4*d* in the first inner region portion 4 and a second inner coating region 8*d* in the last inner region portion 8. In the first and the last inner region portion 4, 8, the web portion is likewise provided with the heat-scalable coating in an I-shaped surface portion of the glassine paper in the respective inner coating regions 4*d*, 8*d* on the first side face S1. The first and the second inner coating region 4*d*, 8*d* extend perpendicularly in relation to the web direction R over the width of the first and the last inner region portion 4, 8.

The fifth embodiment illustrated in FIG. 6 has—as does the first embodiment illustrated in FIG. 2—an information region 12 in a further inner region portion 5 and an information region 11 in a further inner region portion 7. In the present fifth embodiment, the information regions 11, 12 are particularly preferably printed on each of the two side faces S1, S2, which later on form the outer side of a wrapping material 1 in which an article 10 is wrapped.

Figure 7:
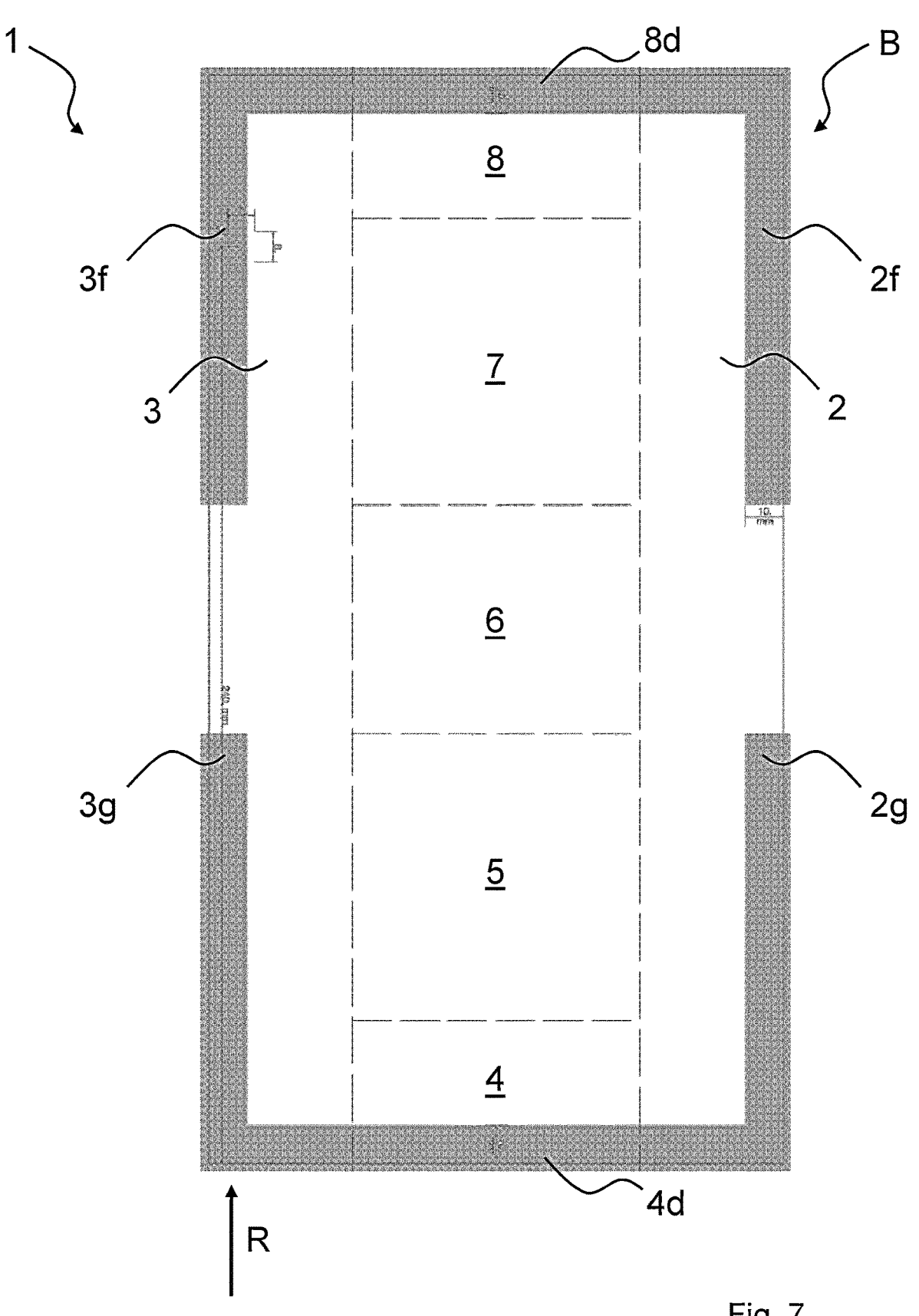
FIG. 7 shows a plan view of a sixth embodiment of a wrapping material according to the invention.

FIG. 7 shows a sixth preferred embodiment of a wrapping material 1 according to the invention. The web portion B has two respective outer coating regions 2*f*, 2*g*, 3*f*, 3*g* both in the first and in the second outer region portion 2, 3. The web portion is provided with the heat-scalable coating in an L-shaped surface portion of the glassine paper in the outer coating regions 2*f*, 2*g*, 3*f*, 3*g* on a first side face S1. The first outer coating regions 2*f*, 2*g* extend perpendicularly in relation to the web direction R over the width of the first outer region portion 2. The same applies correspondingly to the second outer coating regions 3*f*, 3*g*, which extend perpendicularly in relation to the web direction R over the width of the second outer region portion 3. Both the two first and the two second outer coating regions 2*f*, 2*g*, 3*f*, 3*g* are spaced apart from one another in the web direction R. In the present sixth embodiment, the coating of the glassine paper with the heat-sealable coating in the first outer region portion 2 and the coating of the glassine paper with the heat-sealable coating in the second outer region portion 3 are also mirror-symmetrical with respect to the center of the web portion and a mirror plane perpendicular to the web portion.

Analogously to the fifth embodiment, the web portion B of the sixth embodiment has a first inner coating region 4*d* in the first inner region portion 4 and a second inner coating region 8*d* in the last inner region portion 8.

In the present sixth embodiment of the wrapping material 1, a first and a second outer coating region 2*f*, 3*f* and a second inner coating region 8*d* and also a first and a second outer coating region 2*g*, 3*g* and a first inner coating region 4*d* of the glassine paper thus form a respective U-shaped surface portion provided with the heat-sealable coating. The surface portion coated with a U-shaped heat-sealable coating extends along the outer edges of the web portion B.

Figure 8:
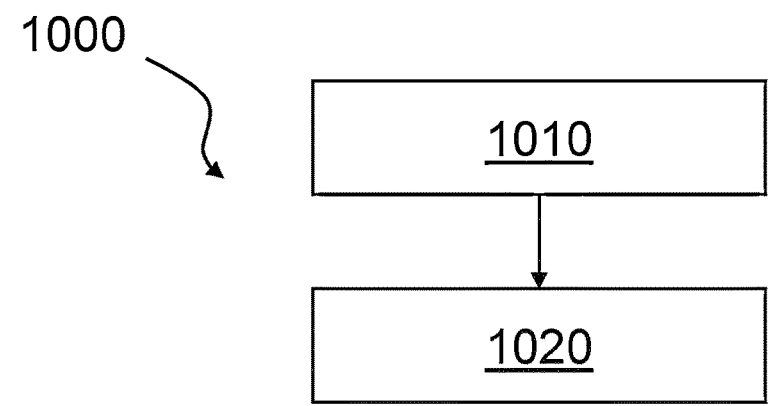
FIG. 8 shows a schematic flow diagram of one embodiment of a method according to the invention for producing a wrapping material 1.

FIG. 8 shows a preferred embodiment of a method 1000 for producing a wrapping material 1. This method 1000 comprises firstly the step of providing 1010 a web of glassine paper with a first side face S1 and a second side face S2 situated opposite the first side face S1. In a subsequent step, coating 1020 of the glassine paper with the heat-sealable coating in a first outer region portion 2 of the web on at least one of the two side faces S1, S2 in at least one first outer coating region 2*a*-2*g*, and in a second outer region portion 3 of the web on at least one of the two side faces S1, S2 in at least one second outer coating region 3*a*, 3*g* is provided.

Figure 9:
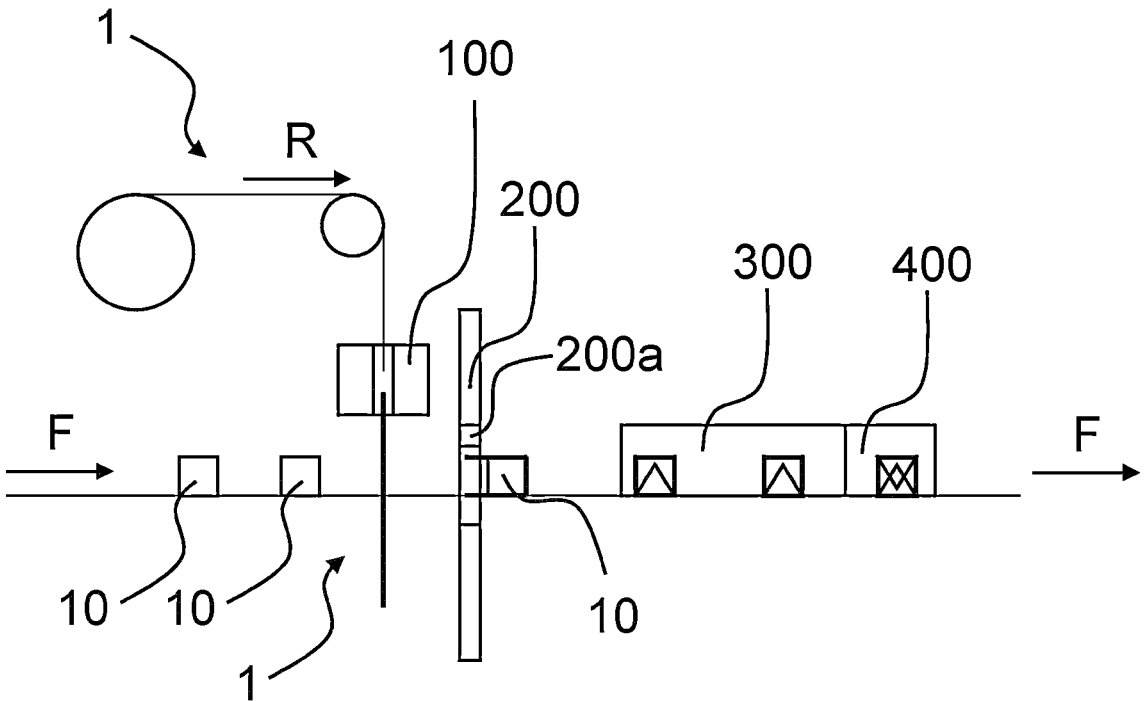
FIG. 9 shows a device for wrapping an article in a wrapping material according to the invention.

FIG. 9 is a schematic illustration of a device which can be used to wrap articles 10 made of a coated and paper-based material in a wrapping material. In particular, the device makes it possible to carry out the preferred embodiments of methods for wrapping an article 10 made of a coated and paper-based material in a wrapping material 1, these embodiments being illustrated as schematic block diagrams in FIGS. 10 and 11. Devices used are preferably conventional film wrapping machines (for example Petri WR 200 or W-350 from Petri Verpackungstechnik GmbH or SOLLAS SE from Sollas Holland BV). The device illustrated schematically in FIG. 9 is described with respect to the preferred embodiments described below of a method 2000 for wrapping an article 10 made of a coated and paper-based material in a wrapping material 1.

Figure 10:
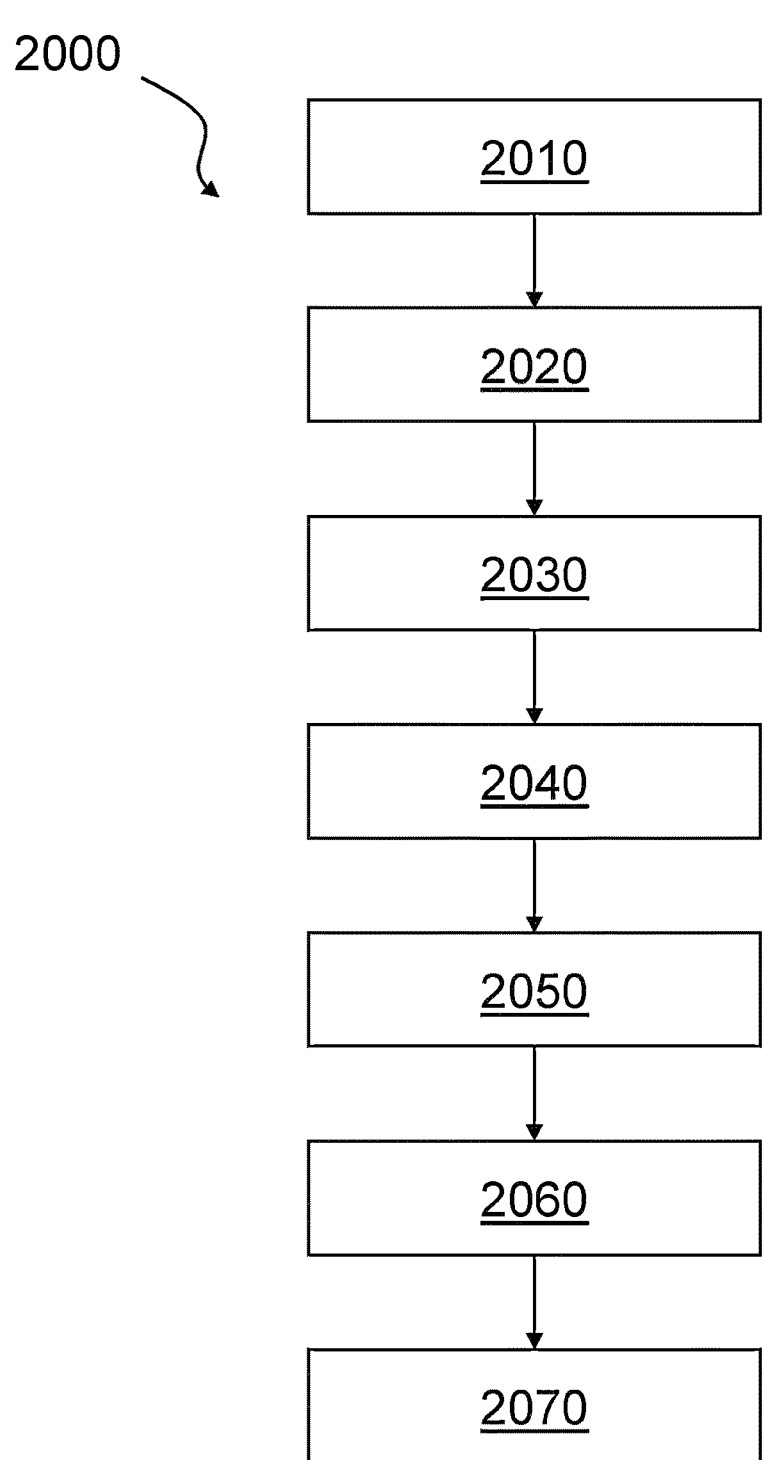
FIG. 10 shows a schematic flow diagram of a first embodiment of a method according to the invention for wrapping an article in a wrapping material according to the invention.

FIG. 10 shows a first preferred embodiment of a method 2000 for wrapping an article 10 made of a coated and paper-based material in a wrapping material 1. In a first step, the method 2000 comprises providing 2010 a wrapping material 1 that was described above. Two subsequent steps of the method 2000 provide firstly feeding 2020 the wrapping material 1 to a separating device 100 and then cutting 2030 the web portion B of the web of the wrapping material 1 to a defined packaging length by means of the separating device 100. The cut-to-length web portion B is then arranged 2040 perpendicularly in relation to a conveying direction F of the article 10 to be wrapped and the wrapped article 10 is inserted between two plates of a wrapping device 200 in the conveying direction F perpendicularly in relation to the cut-to-length web portion B, and wrapped 2050 by means of the wrapping device 200. What follows is folding 2060 of the first and the second outer region portion 2, 3 of the cut-to-length web portion B by means of a folding device 300 and longitudinal sealing 2070 of the wrapped first and second outer region portions 2, 3 by means of a longitudinal-sealing device 400.

Figure 11:
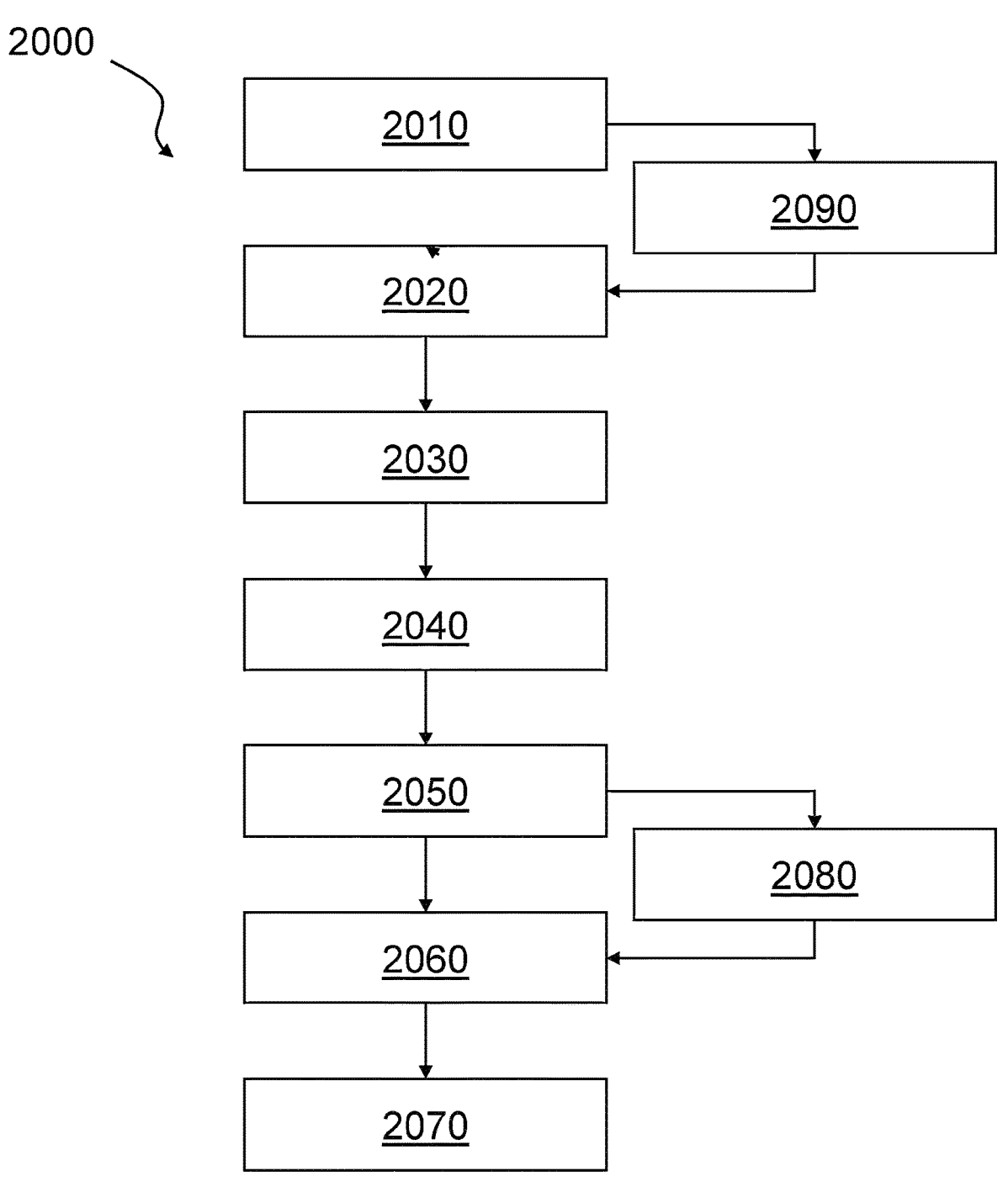
FIG. 11 shows a schematic flow diagram of a second embodiment of a method according to the invention for wrapping an article in a wrapping material according to the invention.

FIG. 11 shows a second preferred embodiment of a method 2000 for wrapping an article 10 made of a coated and paper-based material in a wrapping material 1. The second embodiment of the method 2000 is based on the first embodiment of the method 2000. The second embodiment comprises, as further step, perforating 2090 the wrapping material along the web direction R. The perforating step preferably takes place after the providing 2010 of a wrapping material 1 and before the feeding 2020 of the wrapping material 1 to the separating device 100. The second embodiment of the method 2000 also includes end sealing 2080 of the cut-to-length web portion B, wrapped around the article 10, transversely to the conveying direction F by means of an end-sealing device 200*a*.

LIST OF REFERENCE SIGNS

1 Wrapping material
10 Article 2, 2' First outer region portion
2a-g First outer coating regions
3, 3' Second outer region portion
3a-g Second outer coating region
4, 5, 6, 7, 8, 4' Inner region portions
4a-d First inner coating regions
8a-d Second inner coating regions
11, 12 Information regions
1000 Method
1010 Providing
1020 Coating
100 Separating device
200 Wrapping device
200a End-sealing device
300 Folding device
400 Longitudinal-scaling device
2000 Method
2010 Providing
2020 Feeding
2030 Cutting to length
2040 Arranging
2050 Wrapping
2060 Folding
2070 Longitudinal scaling
2080 End scaling
2090 Perforating
B, B' Web portions
F Conveying direction
R Web direction
S1 First side face
S2 Second side face

The invention claimed is:

1. A wrapping material (1) based on glassine paper for wrapping an article (10), wherein the wrapping material (1) is present in the form of a web, and the web comprises:
   i. a first side face (S1),
   ii. a second side face (S2) situated opposite the first side face (S1),
   iii. at least one web portion (B) having a first and a second outer region portion (2, 3) and inner region portions (4, 5, 6, 7, 8), wherein the inner region portions are arranged between the outer region portions (2, 3), wherein
      1) a heat-sealable coating is applied to the glassine paper on at least one of the two side faces (S1, S2) in at least one first outer coating region (2a-2g) in the first outer region portion (2) of the web portion (B), and
      2) a heat-sealable coating is applied to the glassine paper on at least one of the two side faces (S1, S2) in at least one second outer coating region (3a-3g) in the second outer region portion (3) of the web portion (B),
wherein the glassine paper is characterized by a grammage (measured in the conditioned state of the samples at 23° C./50% RH) in the range of 25 to 50 $g/m^2$.

2. The wrapping material as claimed in claim 1, characterized in that not all of the surface area of the first outer region portion and not all of the second outer region potion has a heat-sealable coating on the glassine paper, even though only one respective side of the respective outer region portion has a coating comprising the heat-sealable coating in the outer coating regions at all.

3. The wrapping material as claimed in claim 1, characterized in that it is present in the form of a rolled-up web.

4. The wrapping material as claimed in claim 1, characterized in that the heat-sealable coating is applied in the form of a water-based or solvent-based, heat-sealable-material-containing lacquer.

5. The wrapping material as claimed in claim 1, characterized in that the heat-sealable material of the heat-sealable coating is a vinyl chloride copolymer or vinyl chloride terpolymer or an ethylene-vinyl acetate copolymer.

6. The wrapping material as claimed in claim 1, characterized in that the heat-sealable coating is applied in an amount in the range of 2 to 12 $g/m^2$.

7. The wrapping material as claimed in claim 1, characterized in that at least the first one of the two side faces (S1, S2) in at least one first outer coating region (2a-2g) has a heat-sealable coating on the glassine paper in the first outer region portion (2) of the web portion (B), and at least the first one of the two side faces (S1, S2) in at least one first outer coating region (3a-3g) has a heat-sealable coating on the glassine paper in the second outer region portion (3) of the web portion (B).

8. The wrapping material as claimed in claim 7, characterized in that at least one first outer coating region (2a-2g) has a heat-sealable coating on the glassine paper in the first outer region portion (2) of the web portion (B) on each of the two side faces (S1, S2), and at least one second outer coating region (3a-3g) has a heat-sealable coating on the glassine paper in the second outer region portion (3) of the web portion (B) on each of the two side faces (S1, S2),
   wherein both side faces (S1, S2) have a heat-sealable coating on the glassine paper in the first outer region portion (2) of the web portion (B) in at least one first outer coating region (2a-2g), and both side faces (S1, S2) have a heat-sealable coating on the glassine paper in the second outer region portion (3) of the web portion (B) in at least one second outer coating region (3a-3g).

9. The wrapping material as claimed in claim 1, characterized in that the coating comprising the heat-sealable coating on the glassine paper in the first outer region portion (2) of the web portion (B) and the coating comprising the heat-sealable coating on the glassine paper in the second outer region portion (3) of the web portion (B) are mirror-symmetrical with respect to the center of the web portion (B) and a mirror plane perpendicular to the web.

10. The wrapping material as claimed in claim 1, characterized in that the first or the last inner region portion (4, 8) of the web portion (B), or both, have a heat-sealable coating on the glassine paper in at least one first inner coating region (4a-4d, 8a-8d).

11. The wrapping material as claimed in claim 1, wherein the heat-sealable coating is a water-based heat-sealable-material-containing lacquer and wherein the heat-sealable material of the heat-sealable coating is an ethylene-vinyl acetate copolymer.

12. The wrapping material as claimed in claim 10, wherein the first or the last inner region portion (4, 8) of the web portion (B), or both, have a heat-sealable coating on the glassine paper in at least one second inner coating region (4a-4d, 8a-8d).

13. A wrapped article comprising the wrapping material as claimed in claim 1 and an article (10), the wrapping material comprises a coated and paper-based material, wherein the article (10) is a self-adhesive note pad or a multipack of 2 to 20 self-adhesive note pads.

14. The wrapped article as claimed in claim 13, characterized in that the multipack comprises self-adhesive note pads with the same color or with different colors.

15. The wrapped article as claimed in claim 13, characterized in that the self-adhesive note pad is a pad of adhesive strips.

16. The wrapped article as claimed in claim 15, wherein the pad of adhesive strips is at least partially encapsulated in a protective element made of cardboard.

17. A method for producing the wrapping material as claimed in claim 1, the method comprising providing a web of glassine paper having a first side face (S1) and a second side face (S2) situated opposite the first side face (S1) and coating the glassine paper with the heat-sealable coating a. on at least one of the two side faces (S1, S2) in at least one first outer coating region (2a-2g) in a first outer region portion (2) of the web portion (B), and b. on at least one of the two side faces (S1, S2) in at least one second outer coating region (3a-3g) in a second outer region portion (3) of the web portion (B).

18. A wrapped article made of a coated and paper-based material, wrapped in a web portion (B) of the wrapping material as claimed in claim 1.

19. The method for wrapping an article (10) made of a coated and paper-based material in a wrapping material (1), wherein the method comprises the following steps:

providing the wrapping material (1) as claimed in claim 1 in the form of a web, feeding the wrapping material (1) to a separating device (100), cutting a web portion (B) of the web to a defined packaging length of the wrapping material (1) by means of the separating device (100), arranging the cut-to-length web portion (B) perpendicularly in relation to a conveying direction (F) of the article (10) to be wrapped, inserting the article (10) to be wrapped between two plates of a wrapping device (200) in the conveying direction (F) perpendicularly in relation to the cut-to-length web portion (B) and wrapping the cut-to-length web portion (B) by means of the wrapping device (200), folding the first and the second outer region portion (2, 3) of the cut-to-length web portion (B) by means of a folding device (300), and longitudinally sealing the wrapped first and second outer region portions (2, 3) by means of a longitudinal-sealing device (400).

20. The method for wrapping an article (10) made of a coated and paper-based material in a wrapping material (1) as claimed in claim 19, wherein the method further comprises the following step:

end sealing the cut-to-length web portion (B), wrapped around the article, transversely to the conveying direction (F) by means of an end-sealing device (200a).

* * * * *